No. 620,570. Patented Mar. 7, 1899.
T. L. CRAFTON.
SEED PLANTER AND FERTILIZER DISTRIBUTER.
(Application filed June 2, 1898. Renewed Feb. 2, 1899.)
(No Model.) 3 Sheets—Sheet 1.
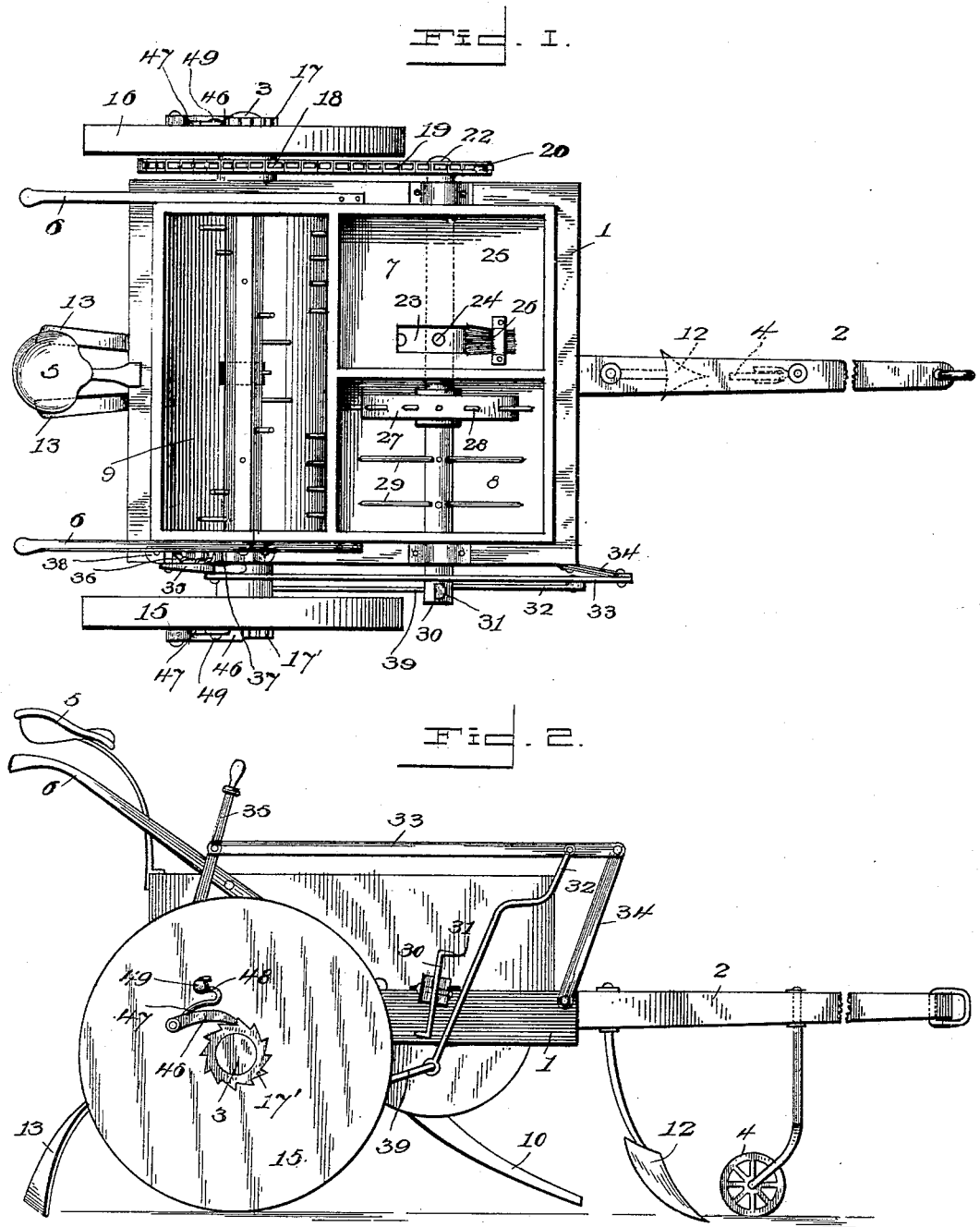
Witnesses: Inventor: Tilman L Crafton,
by H. B. Willson & Co.
his Attorneys.
THE NORRIS PETERS CO., PHOTO-LITHO., WASHINGTON, D. C.

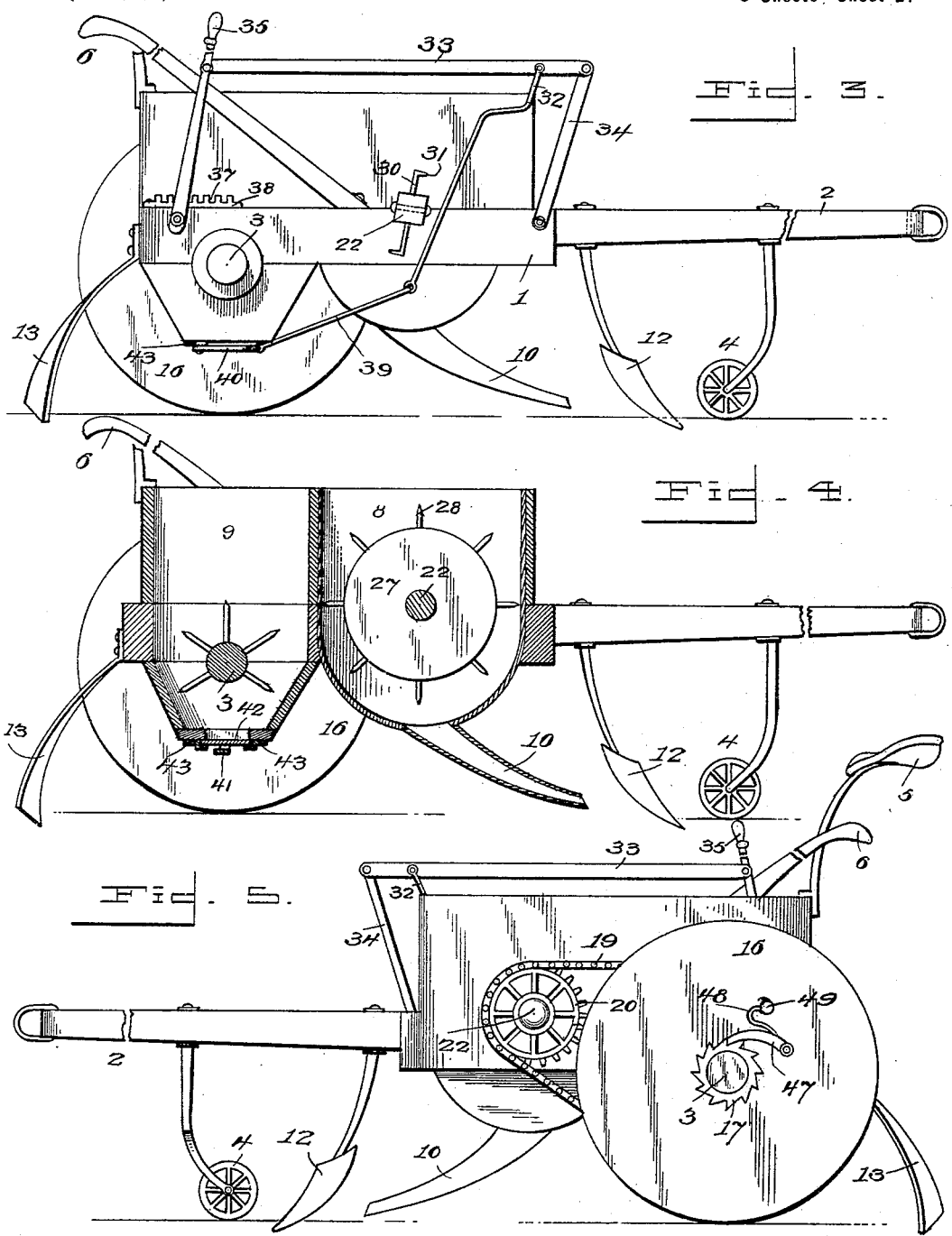

No. 620,570. Patented Mar. 7, 1899.
T. L. CRAFTON.
SEED PLANTER AND FERTILIZER DISTRIBUTER.
(Application filed June 2, 1898. Renewed Feb. 2, 1899.)
(No Model.) 3 Sheets—Sheet 3.
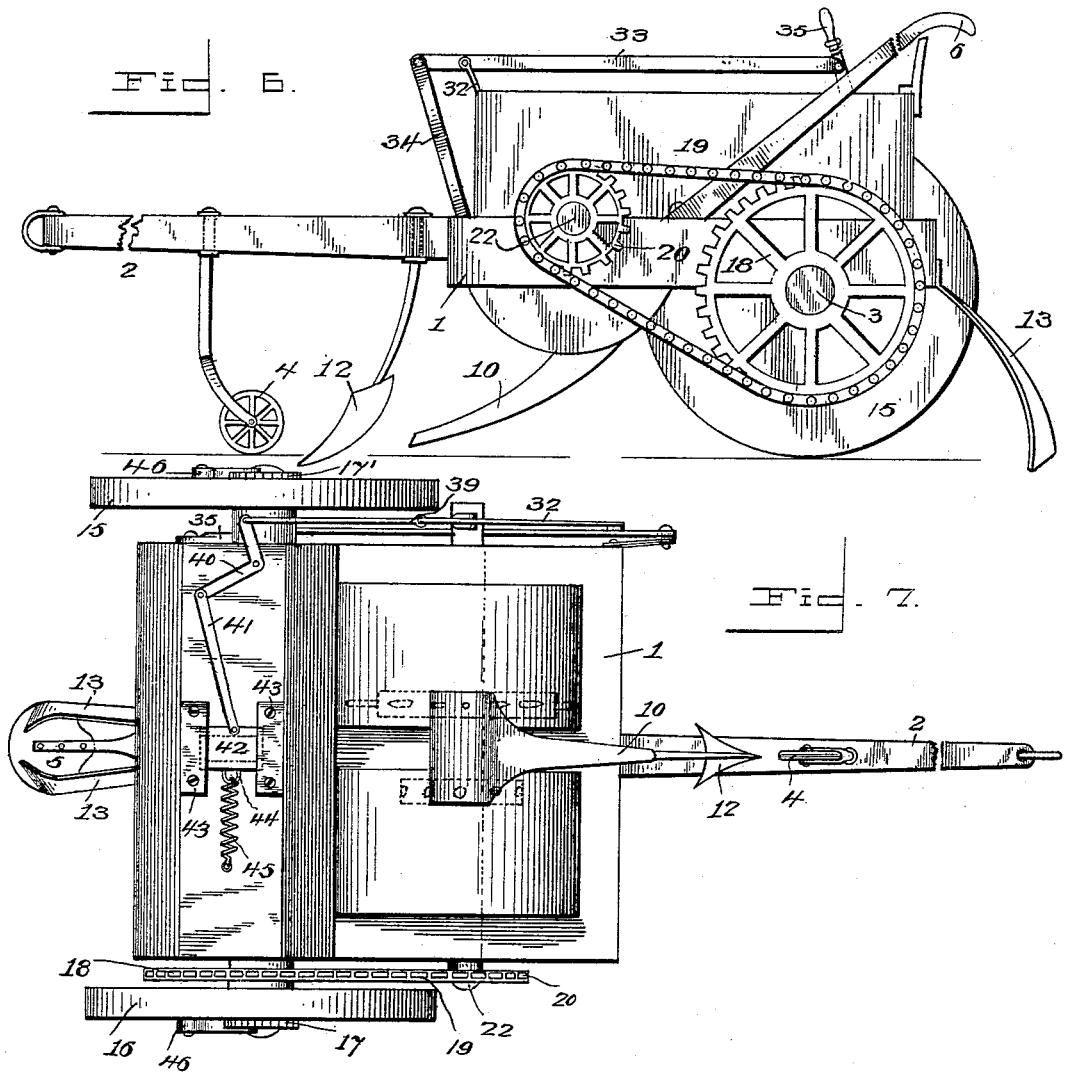
Witnesses:
Inventor:
Tilman L. Crafton
by H. B. Willson & Co.
Attorneys.

UNITED STATES PATENT OFFICE.

TILMAN L. CRAFTON, OF BATESVILLE, ARKANSAS, ASSIGNOR OF TWO-THIRDS TO JAMES W. HOLMES AND ELIJAH M. HOLMES, OF SAME PLACE.

SEED-PLANTER AND FERTILIZER-DISTRIBUTER.

SPECIFICATION forming part of Letters Patent No. 620,570, dated March 7, 1899.

Application filed June 2, 1898. Renewed February 2, 1899. Serial No. 704,305. (No model.)

*To all whom it may concern:*

Be it known that I, TILMAN L. CRAFTON, a citizen of the United States, residing at Batesville, in the county of Independence and State of Arkansas, have invented certain new and useful Improvements in a Combined Corn and Cotton-Seed Planter and Fertilizer-Distributer; and I do declare the following to be a full, clear, and exact description of the invention, such as will enable others skilled in the art to which it appertains to make and use the same.

This invention relates to a combined corn and cotton planter and fertilizer-distributer; and the object is to provide a simple, inexpensive, practical, and effective implement of this character.

To this end the invention consists in certain features of construction and combination of parts, which will be hereinafter more fully described and claimed.

The accompanying drawings show my invention in the best form now known to me; but many changes in the details might be made within the skill of a good mechanic without departing from the spirit of my invention as set forth in the claim at the end of this specification.

The same reference characters indicate the same parts of the invention.

In the drawings, Figure 1 is a top plan of my improved planter and fertilizer-distributer. Fig. 2 is a side elevation. Fig. 3 is a similar view to Fig. 2 with the rear carrying-wheel removed. Fig. 4 is a longitudinal section. Fig. 5 is a side elevation taken from the opposite side to that shown in Fig. 2. Fig. 6 is a similar view with the rear carrying-wheel removed. Fig. 7 is a bottom plan view.

1 denotes the rectangular frame, 2 the tongue, and 3 the axle-shaft, journaled transversely in the rear end of the frame.

4 represents the pilot-wheel, 5 the spring-seat, and 6 6 the usual handles when the machine is guided by hand.

7 denotes the seed-corn box, 8 the cotton-seed box, and 9 the hopper for the fertilizer.

The openings in the bottoms of the corn and cotton boxes communicate with a common spout 10, which extends forwardly and downwardly and terminates at a point immediately in the rear of the furrow-opening blade 12, and 13 13 denote the usual coverer-blades for turning the furrow in upon the seed and fertilizer.

15 16 represent the carrying-weeels, loosely journaled on the outer ends of the axle, and 17 denotes a ratchet-wheel fixed on said axle outside of the wheel 16.

The wheel 16 is provided on its inner face with a sprocket-wheel 18, from which a sprocket-chain 19 extends to a corresponding sprocket-wheel 20, fixed on the projecting end of the counter or feed shaft 22, journaled in the front end of the frame and extending transversely through the seedboxes.

I do not desire to limit myself to the mechanism just described for conveying motion to the feed-shaft, as it is evident that a train of gearing or any other suitable mechanism may be employed for this purpose.

23 represents the seed-wheel for dropping the corn. It is fixed on the feed-shaft 22 within the seed-corn box and is provided with a series of radial pockets 24 to receive and drop the corn.

25 represents the bottom of the seed-corn box, through which the seed-wheel projects, and 26 denotes a brush or stationary sweep to brush off the surplus corn contained in the pockets.

27 represents the cotton-seed feed-wheel, likewise fixed on the seed-shaft 22 within the cotton-seed box, and it is provided with a series of radial spur-teeth 28 to loosen up the seeds and permit them to drop through seed-spout 10. A series of radial pins 29 are also fixed on the seed-shaft 22 to agitate and separate the cotton-seeds, so as to present them in a separated state to the seed-wheel.

30 represents a transverse arm fixed to one end of the feed-shaft 22, and its opposite ends terminate in angular toes 31 31, which project into the path of a depending lever 32, fulcrumed at its upper end on a longitudinal horizontal bar 33, the forward end of which is pivoted to a vertical lever 34, fulcrumed on the forward end of the frame, while the rear end of said bar 33 is pivoted to the upper end of a vertical hand-lever 35, fulcrumed at the rear end of the frame. This hand-lever is provided with the usual pawl, (not shown,) which is arranged to alternately engage the notches 37 37 in the rack 38 to retain the lever in position when the machine is thrown in or out of gear. The lower end of the lever 32 is pivoted to a rod 39, the rear end of which is pivoted to a bell-crank lever 40, fulcrumed on the bottom of the fertilizer-box, and the opposite arm of said bell-crank lever is pivoted to the outer end of a bar 41, which in turn is pivoted to the slide-valve 42, adapted to slide transversely in the parallel guides 43 43, the opposite or free end of said valve being provided with a loop or link 44, the outer end of which is connected to the inner end of a spiral spring 45, having its opposite end fixed to the bottom of the fertilizer-box, as shown. The opposite end of the axle is also provided with a ratchet-wheel 17′, corresponding to the ratchet 17 on the outside of the carrying-wheel 16, and each carrying-wheel 15 and 16 is provided with a pivoted pawl 46, the free end of which is adapted to engage its respective ratchet-wheel, so that when the pawls are in engagement the carrying-wheels will impart a rotary movement to the axle. At the same time the arrangement is such that when the machine is turning corners or rounding curves in either direction the ratchet-wheels and pawls will compensate for the difference in speed in the carrying-wheels while traversing the curves.

Each pivoted pawl 46 is provided with a fixed S-shaped spring 47, the middle arm 48 of which is arranged to rest under a stud 49, fixed to the wheel, so that the tension of the spring will be exerted to retain the pawl in contact with the ratchet-wheel, as shown in Fig. 2; but if the arm 48 of said spring be released from under said stud 49 and passed over the stud the pawl will be held out of engagement with its ratchet, and consequently the axle and the feed-shaft will be thrown out of gear, so as to prevent their rotating while the machine is being transported from place to place.

Having thus fully described my invention, what I claim as new, and desire to secure by Letters Patent, is—

In a combined implement, the combination with the frame, the feed-shaft and the axle independently journaled in said frame and operatively connected to rotate simultaneously the fertilizer-hopper, the feed-valve mounted in the bottom thereof, the spring connected to one end of said valve, the bell-crank lever 40 fulcrumed to the bottom of said hopper and operatively connected to the opposite end of said valve, of the transverse arm 30 fixed to said feed-shaft, the hand-lever 35 and the vertical lever 34 fulcrumed on said frame, the bar 33 connecting said levers 34 and 35, the depending lever 32 fulcrumed on said bar and projecting into the path of said arm 30, and the rod 39 connecting said bell-crank lever 40 and depending lever 32, substantially as shown and described.

In testimony whereof I have hereunto set my hand in presence of two subscribing witnesses.

TILMAN L. CRAFTON.

Witnesses:
M. H. LONG,
W. C. PARSONS.